United States Patent
Tost

(10) Patent No.: US 6,637,196 B1
(45) Date of Patent: Oct. 28, 2003

(54) DEVICE AND METHOD FOR DENOXING EXHAUST GAS FROM AN INTERNAL COMBUSTION ENGINE

(75) Inventor: Rainer Tost, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/155,289

(22) Filed: May 24, 2002

Related U.S. Application Data

(63) Continuation of application No. PCT/DE00/04066, filed on Nov. 16, 2000.

(30) Foreign Application Priority Data

Nov. 24, 1999 (DE) .......................................... 199 56 493

(51) Int. Cl.$^7$ ................................................. F01N 3/00
(52) U.S. Cl. .............................. 60/286; 60/295; 60/301; 60/303
(58) Field of Search ..................... 60/286, 295, 301, 60/303; 423/237, 238

(56) References Cited

U.S. PATENT DOCUMENTS

| | | | | |
|---|---|---|---|---|
| 5,522,218 A | * | 6/1996 | Lane et al. ..................... | 60/274 |
| 5,605,042 A | * | 2/1997 | Stutzenberger .............. | 60/286 |
| 5,643,536 A | * | 7/1997 | Schmelz ...................... | 422/105 |
| 5,753,188 A | * | 5/1998 | Shimoda et al. ............. | 422/108 |
| 5,809,774 A | * | 9/1998 | Peter-Hoblyn et al. ....... | 60/274 |
| 5,953,908 A | * | 9/1999 | Appleby ....................... | 60/275 |
| 6,041,594 A | * | 3/2000 | Brenner et al. ............... | 60/309 |
| 6,050,088 A | * | 4/2000 | Brenner ....................... | 60/303 |
| 6,209,315 B1 | * | 4/2001 | Weigl .......................... | 60/274 |
| 6,471,924 B1 | * | 10/2002 | Feeley et al. ............ | 423/213.5 |

FOREIGN PATENT DOCUMENTS

| | | |
|---|---|---|
| DE | 42 14 183 A1 | 6/1993 |
| DE | 197 43 337 C1 | 1/1999 |
| EP | 0 577 853 B1 | 5/1995 |
| EP | 0 928 884 A2 | 7/1999 |
| WO | WO 99/49958 | 10/1999 |

OTHER PUBLICATIONS

"Selective Catalytic Reduction", DieselNet Technology Guide, Diesel Catalysts, Online, Aug. 2000, pp. 1–11.

* cited by examiner

*Primary Examiner*—Thomas Denion
*Assistant Examiner*—Diem Tran
(74) *Attorney, Agent, or Firm*—Laurence A. Greenberg; Werner H. Stemer; Gregory L. Mayback

(57) ABSTRACT

A device and a method for deNOxing exhaust gas from an internal combustion engine includes taking into account an amount of gaseous reducing agent (ammonia) that escapes while the internal combustion engine is at a stand-still as a result of temperature influences in a calculation of the amount of reducing-agent solution (urea) that is to be metered when the internal combustion engine is operating. The gaseous reducing agent is passed to the reduction catalytic converter through a pressure-relief line that includes a pressure-control valve, and, in the method, the amount is recorded by a flowmeter.

15 Claims, 2 Drawing Sheets

DEVICE AND METHOD FOR DENOXING EXHAUST GAS FROM AN INTERNAL COMBUSTION ENGINE

CROSS-REFERENCE TO RELATED APPLICATION

This application is a continuation of copending International Application PCT/DE00/04066, filed Nov. 16, 2000, which designated the United States and which was not published in English.

BACKGROUND OF THE INVENTION

Field of the Invention

The invention relates to a device and a method for deNOxing exhaust gas from an internal combustion engine.

The reduction of the nitrogen oxide emissions from an internal combustion engine that operates with excess air, in particular, a diesel internal combustion engine, can be effected with the aid of selective catalytic reduction (SCR), to form atmospheric nitrogen ($N_2$) and water vapor ($H_2O$). The reducing agents used are either gaseous ammonia ($NH_3$), ammonia in aqueous solution, or urea in aqueous solution. The urea serves as an ammonia carrier and is injected into the exhaust system with the aid of a metering system upstream of a hydrolysis catalytic converter, where it is converted into ammonia by hydrolysis, and the ammonia then reduces the nitrogen oxides in the actual SCR or deNOx catalytic converter.

The important components of such a metering system are a reducing-agent vessel, a pump, a pressure sensor, and a metering valve. The pump conveys the reducing agent stored in the reducing-agent vessel to the metering valve, by which the reducing agent is injected into the exhaust-gas stream upstream of the hydrolysis catalytic converter. The metering valve is actuated through signals from a control device such that a defined, currently required amount of reducing agent is supplied as a function of operating parameters of the internal combustion engine (German Patent DE 197 43 337 C1, corresponding to U.S. Pat. No. 6,082,102 to Wissler et al.).

An advantage of the ammonia-releasing substances that are present in aqueous solutions, such as, for example, urea, is that the storage, handling, delivery, and metering are, in technical terms, relatively simple to implement. A drawback of these aqueous solutions is that, in the event of heating above a defined temperature limit, which in turn is dependent, inter alia, on the concentration of the-dissolved substance, thermal decomposition of the solution starts to occur in the reducing-agent tank.

At high temperatures, for example, when the vehicle equipped with an exhaust-gas aftertreatment installation of this type is parked at locations with high insolation, or even while the vehicle is operating in hot regions, the reducing agent, which can be at least partially converted into ammonia, may be overheated. The decomposition vapor pressure, which increases as the temperature rises, for, for example, an aqueous urea solution, leads to the formation of ammonia and, therefore, to an increase in pressure in the reservoir.

In order, on one hand, to prevent the reservoir from being destroyed by an unacceptably high pressure and, on the other hand, to prevent slippage of ammonia, in particular, when the filler neck of the reservoir is opened, European Patent Application EP 0 577 853 B1 discloses, in an exhaust-gas aftertreatment installation for an internal combustion engine of the type described in the introduction, connecting a pressure-relief line, which feeds excess reducing agent to the deNOx catalytic converter, to the reservoir for the reducing agent. The pressure-relief line is connected to the inlet of the deNOx catalytic converter, i.e., to the side that faces the internal combustion engine. A pressure-control valve is incorporated in the pressure-relief line. As a result, the amount of excess ammonia that is to be received by the deNOx catalytic converter can be limited within the scope of the compressive strength of the reservoir.

In the prior art pressure relief method, although it is possible to avoid an unacceptably high build-up of pressure in the reservoir, the amount of reducing agent that is fed to the catalytic converter through the pressure-relief line can only be taken into account to an insufficient extent during the metering strategy.

SUMMARY OF THE INVENTION

It is accordingly an object of the invention to provide a device and method for deNOxing exhaust gas from an internal combustion engine that overcomes the hereinafore-mentioned disadvantages of the heretofore-known devices and methods of this general type and that reliably prevents an unacceptably is high pressure in a reducing-agent reservoir of an exhaust-gas aftertreatment device of the type described in the introduction without impairing the metering accuracy.

With the foregoing and other objects in view, there is provided, in accordance with the invention, a device for deNOxing exhaust gas from an internal combustion engine having an exhaust pipe conveying exhaust gas in an exhaust direction includes a reduction catalytic converter operating under an SCR principle, the converter, disposed in the exhaust pipe, a reducing-agent reservoir for holding a reducing agent, a metering device for introducing the reducing agent into exhaust gas flowing to the converter, a reducing-agent pump for delivering the reducing agent from the reservoir to the metering device, the pump fluidically connecting the reservoir to the metering device, the metering device fluidically connecting the pump to the exhaust pipe upstream of the converter with respect to the exhaust direction, a pressure-relief line for feeding excess reducing agent from the reservoir to the converter, the pressure-relief line fluidically connecting the reservoir to the converter, and a flow-measuring device for recording an amount of excess reducing agent passing through the pressure-relief line, the flow-measuring device disposed in the pressure-relief line.

As a result of the amount of gaseous reducing agent that escapes while the internal combustion engine is at a stand still, due to temperature influences being taken into account during the determination of the amount of reducing-agent solution that is to be metered when the internal combustion engine is operating, not only is the operational reliability increased, even in the range of critical ambient conditions, for example, in summertime operation, but also a high metering accuracy is achieved.

The targeted utilization of the gaseous reducing agent that is released by the heating, i.e., ammonia, when an aqueous urea solution is used as reducing agent, prevents slippage of reducing agent because, when a predetermined pressure level is reached in the reducing-agent reservoir, the gaseous reducing agent is passed into the reduction catalytic converter through a pressure-relief line. The amount of gaseous reducing agent that flows in is advantageously recorded by a flowmeter in the pressure-relief line and is taken into account during the calculation of the amount of reducing agent. For example, when the internal combustion engine is operating, liquid reducing agent is only injected again in a controlled manner into the exhaust pipe of the internal combustion engine when the gaseous reducing agent in the reduction catalytic converter has been consumed.

When the vehicle is parked, the values for pressure and opening time of a valve device disposed in the pressure-relief line can be stored by an intelligent sensor configuration and, after the internal combustion engine has been started these values are interrogated by a control unit that controls the metering of the reducing agent, are transmitted and the stored current reduction catalytic converter level can be corrected accordingly.

In accordance with another feature of the invention, the pressure-relief line has a cross-sectional opening for conveying the excess reducing agent, a pressure-control valve is disposed in the pressure-relief line, and the valve opens the cross-sectional opening when a predetermined pressure exists in the reservoir to permit the excess reducing agent to pass through the pressure-relief line.

In accordance with a further feature of the invention, the pressure-relief line has a cross-sectional opening for conveying the excess reducing agent, an electrically controllable valve) is disposed in the pressure-relief line, and the valve opens the cross-sectional opening when a predetermined pressure exists in the reservoir to permit the excess reducing agent to pass through the pressure-relief line.

In accordance with an added feature of the invention, the is flow-measuring device is a flowmeter, preferably, for ammonia.

In accordance with an additional feature of the invention, the pressure-relief line has an exit opening inside the converter.

In accordance with yet another feature of the invention, the reducing agent is a liquid.

With the objects of the invention in view, there is also provided a method for deNOxing exhaust gas from an internal combustion engine including the steps of determining, as a function of operating parameters of at least one of the internal combustion engine and a reduction catalytic converter operating under an SCR principle, an amount of reducing-agent solution to be metered and introducing the amount of the reducing agent into an exhaust pipe upstream of the converter while the internal combustion engine is operating, when the internal combustion engine is at a stand-still, feeding gaseous reducing agent formed as a result of temperature effects to the converter, and recording and taking into account an amount of the gaseous reducing agent during a determination of an amount of reducing-agent solution to be metered during operation of the internal combustion engine.

In accordance with yet a further feature of the invention, the gaseous reducing agent is supplied at a location inside the converter through a pressure-relief line connecting a reducing-agent reservoir and the converter.

In accordance with yet an added feature of the invention, the gaseous reducing agent is fed to the converter when a pressure in the reservoir exceeds a predetermined pressure level.

In accordance with yet an additional feature of the invention, the pressure-relief line is opened with a valve device disposed in the pressure-relief line when the predetermined pressure level is reached.

In accordance with again another feature of the invention, an amount of the gaseous reducing agent is determined with a flow-measuring device disposed in the pressure-relief line.

In accordance with again a further feature of the invention, an amount of the gaseous reducing agent is determined from a value for the pressure in the reservoir and a duration of an opening of the valve device.

In accordance with a concomitant feature of the invention, the reducing agent is aqueous urea solution and the flow-measuring device is a flowmeter for ammonia.

Other features that are considered as characteristic for the invention are set forth in the appended claims.

Although the invention is illustrated and described herein as embodied in a device and method for deNOxing exhaust gas from an internal combustion engine, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
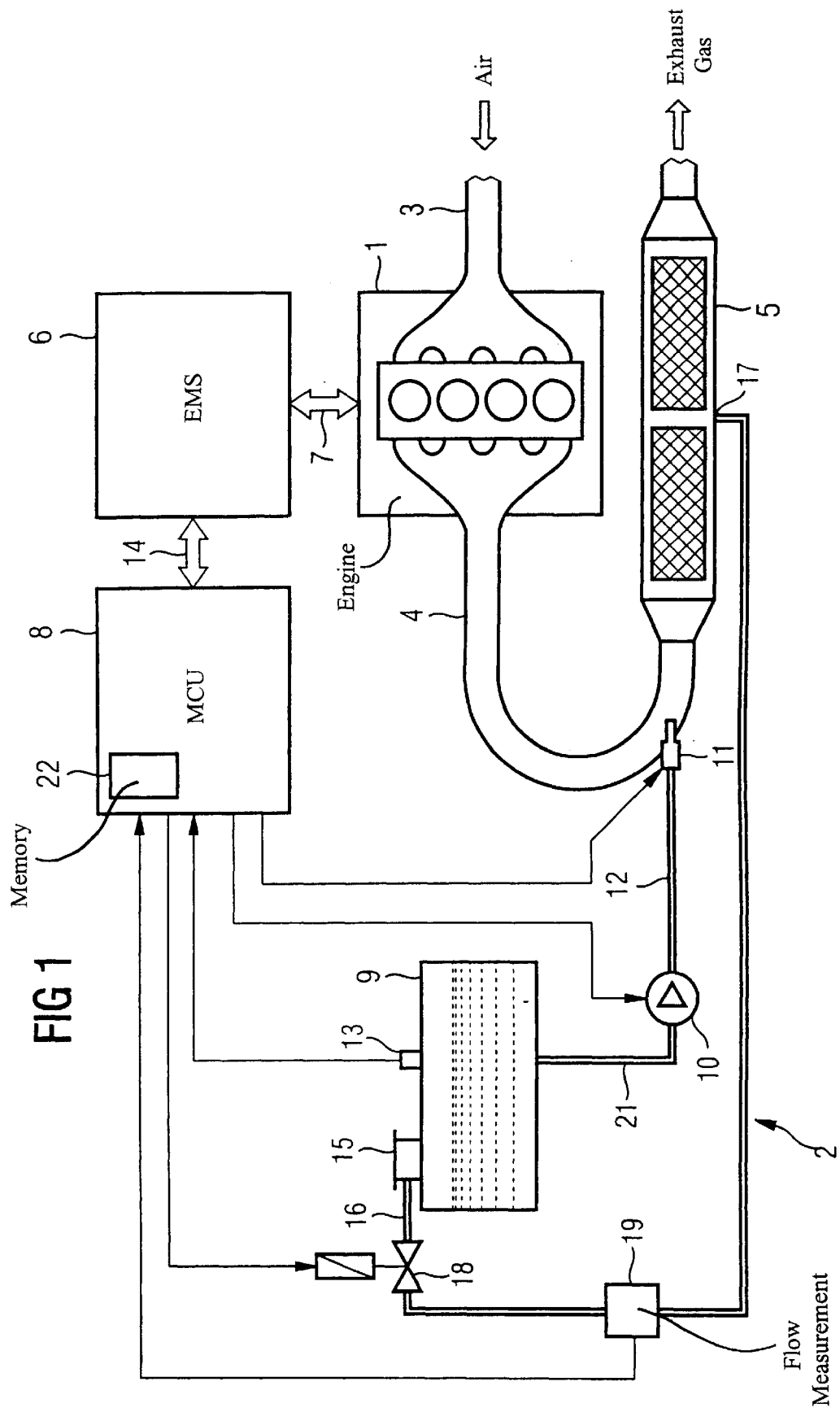
FIG. 1 is a block circuit diagram of an active tank-pressure control configuration and controlled pressure relief into the exhaust-gas catalytic converter according to the invention.
Figure 2:
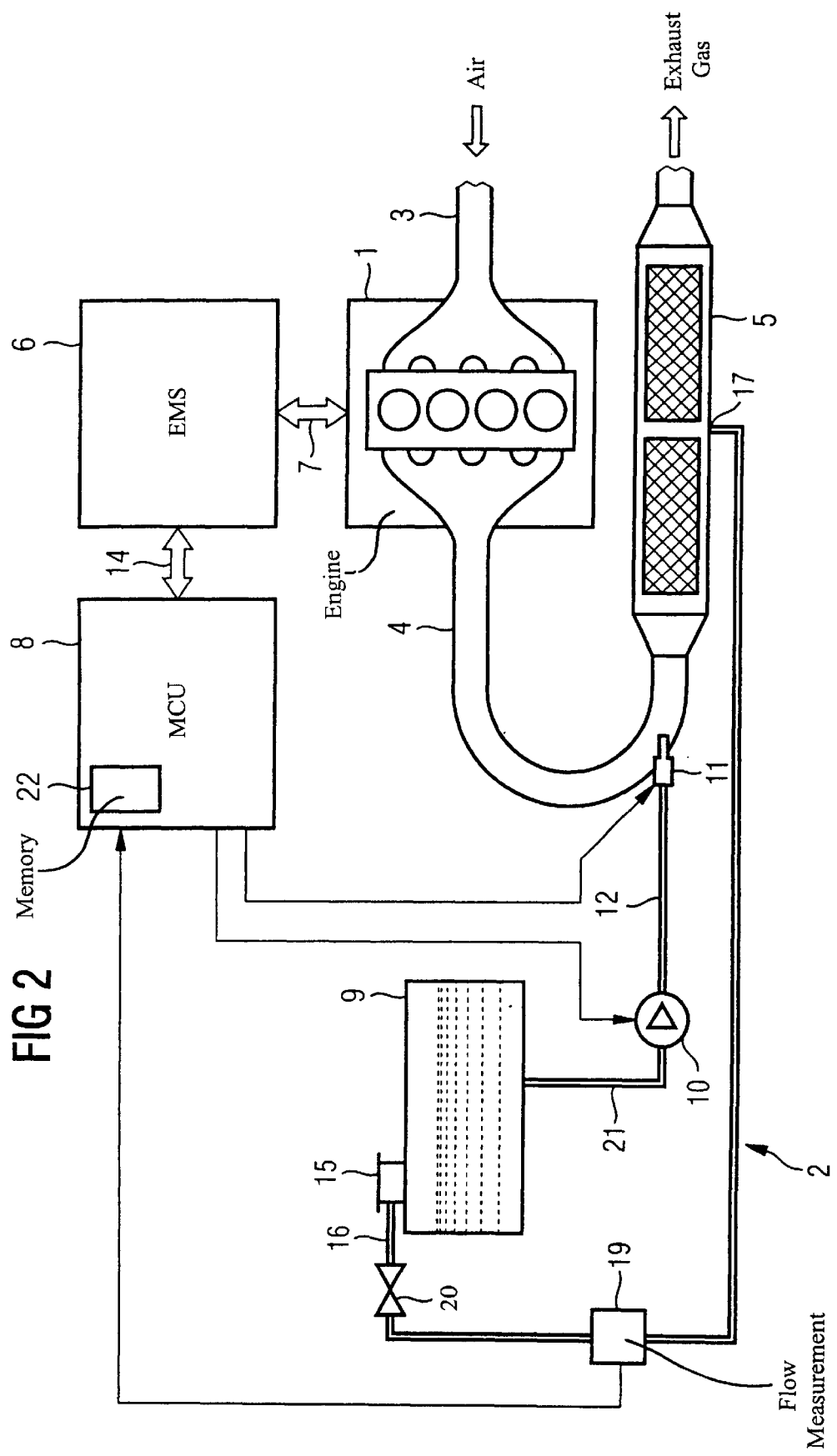
FIG. 2 is a block circuit diagram of a passive tank-pressure control configuration and controlled pressure relief into the exhaust-gas catalytic converter according to the invention.

A feature that is common to both FIGS. 1 and 2 is that only those components of the internal combustion engine and the associated device for deNOxing exhaust gas that are required to gain an understanding of the invention are illustrated. In particular, the fuel circuit has not been illustrated. In the exemplary embodiments, the internal combustion engine shown is a diesel internal combustion engine, and aqueous urea solution is used as reducing agent for the aftertreatment of the exhaust gas. Identical components are provided with identical reference symbols throughout the figures and are only explained once, with reference to the description relating to FIG. 1.

Referring now to the figures of the drawings in detail and first, particularly to FIG. 1 thereof, there is shown a block circuit diagram that represents a highly simplified form of a diesel internal combustion engine 1 that is equipped with a device 2 for deNOxing exhaust gas and to which the air required for combustion is supplied through an induction duct 3, which is only partially illustrated. On the outlet side, the internal combustion engine 1 is connected to an exhaust pipe 4, further along the exhaust pipe 4 is disposed an SCR storage reduction catalytic converter 5, referred to below simply as a reduction catalytic converter.

To control the internal combustion engine 1, a conventional engine management system (EMS) 6 is connected to the internal combustion engine 1 through a data and control line 7, which is only diagrammatically illustrated in the figure. Signals from sensors (e.g., temperature sensors for intake air, charge air, coolant, load sensor, speed sensor) and signals for actuators (e.g., injection valves, final control members) are transmitted between the internal combustion engine 1 and the engine management system 6 through the data and control line 7.

The device 2 for deNOxing exhaust gas has, in addition to the reduction catalytic converter 5, which includes, by way of example, a plurality of catalytic converter units that are connected in series and are not described in more detail, a metering control unit (MCU) 8, a reducing-agent reservoir 9 with an electrically actuable reducing-agent pump 10 for delivering the reducing agent, and a metering device, in the form of a metering valve 11. The reducing-agent pump 10 is connected by a suction line 21 to the reducing-agent reservoir 9 and by a feed line 12 to the metering valve 11. In addition, a non-illustrated oxidation catalytic converter may be disposed upstream and/or downstream of the reduction catalytic converter 5.

In this exemplary embodiment, the reducing agent used is aqueous urea solution that is stored in the reducing-agent reservoir 9. On the top of the reducing-agent reservoir 9 there is a pressure sensor 13, which transmits a signal that corresponds to the pressure in the reducing-agent reservoir 9 to the metering control unit 8. The reducing-agent reservoir 9 is also associated with further non-illustrated sensors that record the temperature of the aqueous urea solution and the filling level in the reducing-agent reservoir 10.

Moreover, the signals from a non-illustrated temperature sensor disposed upstream of the reduction catalytic converter 5 and from a non-illustrated exhaust-measuring pick-up, e.g., a NOx sensor, disposed downstream of the reduction catalytic converter are transmitted to the metering control unit 8.

When required, the metering control unit 8 actuates the electromagnetic metering valve 11, to which urea solution is supplied from the reducing-agent reservoir 9 through the feed line 12 and with the aid of the reducing-agent pump 10. The urea solution is injected into the exhaust pipe 4 upstream of the reduction catalytic converter 5 by the metering valve 11.

For reciprocal exchange of data, the metering control unit 8 is electrically connected to the engine management system 6, for example, through a CAN bus 14. The operating parameters that are of relevance for calculation of the amount of urea solution to be metered, such as the engine speed, the air mass, the fuel mass, the control distance of an injection pump, the exhaust-gas mass flow, the operating temperature, the charge-air temperature, the start of injection, etc., are transmitted to the metering control unit 8 through the bus 14.

It is also possible for the functions of the metering control unit 8 for the reducing-agent metering system to be integrated into the engine management system 6 of the internal combustion engine.

Working on the basis of these parameters and the measured values for the exhaust gas temperature and the NOx content in the exhaust gas, the metering control unit 8 calculates the quantity of urea solution that is to be injected and transmits a corresponding electrical signal, through an electrical connection line that is not shown in more detail, to the metering valve 11. The urea is hydrolyzed and thoroughly mixed as a result of its injection into the exhaust pipe 4. The catalytic reduction of the $NO_x$ in the exhaust gas to form $N_2$ and $H_2O$ takes place in the catalytic converter units of the reduction catalytic converter.

A pressure-relief line 16 branches off in the upper part of the reducing-agent reservoir 9, in particular, at a filler neck 15 of the reducing-agent reservoir 9. The branching at the filler neck 15, in combination with a non-illustrated float valve, ensures that it is impossible for any liquid reducing agent to enter the pressure-relief line 16 even when the reducing-agent vessel 9 is completely full. The pressure-relief line 16 ends at a location 17 inside the reduction catalytic converter 5. Selecting the feed point in such a way reliably prevents ammonia from being able to flow toward the internal combustion engine as a result of a stack effect forming through the residual heat of the exhaust system when the internal combustion engine 1 is at a stand-still. Such a configuration prevents possible corrosion damage to parts of the internal combustion engine 1, in particular, to bearings, housing parts, valve seats, and piston heads as a result of the chemically aggressive nature of ammonia.

A valve 18, which can be controlled by electrical control signals from the metering control unit 6, and a flow-measuring device 19, e.g., a flowmeter for ammonia ($NH_3$), which when the valve 18 is open transmits a signal corresponding to the throughput of the gaseous reducing agent escaping to the metering control unit 6, are disposed along the relief line 16.

The operation of this device, as diagrammatically illustrated in FIG. 1, is explained below.

The pressure in the reducing-agent reservoir 9 is continuously monitored with the aid of the pressure sensor 13. An increase in the temperature causes gaseous ammonia to evolve, which leads to an increase in the pressure in the reducing-agent reservoir 9. If the pressure in the reducing-agent reservoir exceeds a limit value, which is determined according to application, inter alia, as a function of the geometry and configuration of the reducing-agent reservoir, and also of the ambient pressure, and that is stored in a memory 22 of the metering control unit 8, the electric valve 18 is opened by signals from the metering control unit 8. Ammonia flows through the flow-measuring device 19 into the reduction catalytic converter 5. When the pressure in the reducing-agent vessel 9 has been completely reduced, in which connection the signal from the pressure sensor 13 is reevaluated, the valve 18 is closed.

Because the ammonia storage capacity of the SCR catalytic converter is limited by its volume and its temperature, and the efficiency of the reduction catalytic converter is also determined by the quantity of ammonia stored, the quantity of ammonia that flows into the reduction catalytic converter 5 as a result of the evolution of gas is recorded by the flow-measuring device 19, and the value is stored in the memory 22 of the metering control unit 6. While the internal combustion engine 1 is operating, the metering control unit 6 cyclically determines the efficiency of the reduction catalytic converter and a desired value for the quantity of reducing agent that is to be metered. The quantity of reducing agent is calculated from operating parameters of the internal combustion engine, such as the air mass, operating temperature, catalytic converter temperature, and/or load. The quantity of reducing agent so calculated is then corrected base upon the additional quantity of ammonia that has already been supplied to the reduction catalytic converter during the evolution of gas. For such a purpose, the signal from the flowmeter 19 is evaluated. The evaluation can be achieved, for example, by storing a relationship between the quantity of gaseous ammonia that has escaped and the associated quantity of reducing agent (aqueous urea solution) in a characteristic diagram or a table. The metered quantity of aqueous urea, which is calculated as a function of the operating point, is then reduced by such an amount. It is, therefore, possible to reliably avoid both an unacceptably high pressure in the reducing-agent reservoir and slippage of ammonia.

FIG. 2 shows a tank-pressure control configuration that, unlike the exemplary embodiments described above, is not active. Rather, it is passive, and, therefore, an easier and less expensive way of reducing the pressure in the reducing-agent vessel without influencing the accuracy of metering.

The device fundamentally corresponds to the structure that has been explained with reference to FIG. 1. The difference is that there is no need for a pressure sensor 13, and it is not an electrically actuable valve 11, but rather a mechanically acting pressure-control valve 20 that is disposed in the relief line 16. The pressure-control valve 20 opens automatically when a predetermined pressure is reached in the reducing-agent vessel 9. The quantity of gaseous ammonia that escapes is in such a case, too, recorded by the flow-measuring device 19 and is taken into account in the metering strategy in the same manner as that described above.

As an alternative to the flow-measuring device 19 that records the quantity of ammonia, it is also possible to determine the quantity of gaseous ammonia that has escaped based upon the signals from the pressure sensor 13 and the opening time of the relief valve 18, 20, for example, by a characteristic diagram or a table that is stored in the memory 22.

I claim:

1. A device for deNOxing exhaust gas from an internal combustion engine having an exhaust pipe conveying exhaust gas in an exhaust direction, comprising:

a reduction catalytic converter operating under an SCR principle, said converter, disposed in the exhaust pipe;

a reducing-agent reservoir for holding a reducing agent;

a metering device for introducing said reducing agent into exhaust gas flowing to said converter;

a reducing-agent pump for delivering said reducing agent from said reservoir to said metering device;

said pump fluidically connecting said reservoir to said metering device;

said metering device fluidically connecting said pump to the exhaust pipe upstream of said converter with respect to the exhaust direction;

a pressure-relief line for feeding excess reducing agent from said reservoir to said converter;

said pressure-relief line fluidically connecting said reservoir to said converter; and a flow-measuring device for recording an amount of excess reducing agent passing through said pressure-relief line, said flow-measuring device disposed in said pressure-relief line.

2. The device according to claim 1, wherein:

said pressure-relief line has a cross-sectional opening for conveying said excess reducing agent;

a pressure-control valve is disposed in said pressure-relief line; and said valve opens said cross-sectional opening when a predetermined pressure exists in said reservoir to permit said excess reducing agent to pass through said pressure-relief line.

3. The device according to claim 1, wherein:

said pressure-relief line has a cross-sectional opening for conveying said excess reducing agent;

an electrically controllable valve is disposed in said pressure-relief line; and said valve opens said cross-sectional opening when a predetermined pressure exists in said reservoir to permit said excess reducing agent to pass through said pressure-relief line.

4. The device according to claim 1, wherein said flow-measuring device is a flowmeter.

5. The device according to claim 1, wherein said flow-measuring device is a flowmeter for ammonia.

6. The device according to claim 1, wherein said pressure-relief line has an exit opening inside said converter.

7. The device according to claim 1, wherein said reducing agent is a liquid.

8. In an internal combustion engine having an exhaust pipe conveying exhaust gas in an exhaust direction, a device for deNOxing exhaust gas in the exhaust pipe comprising:

a reduction catalytic converter operating under an SCR principle, said converter, disposed in the exhaust pipe;

a reducing-agent reservoir for holding a reducing agent;

a metering device for introducing said reducing agent into the exhaust gas flowing to said converter;

a reducing-agent pump for delivering said reducing agent from said reservoir to said metering device;

said pump fluidically connecting said reservoir to said metering device;

said metering device fluidically connecting said pump to the exhaust pipe upstream of said converter with respect to the exhaust direction;

a pressure-relief line for feeding excess reducing agent from said reservoir to said converter;

said pressure-relief line fluidically connecting said reservoir to said converter; and a flow-measuring device for recording an amount of excess reducing agent passing through said pressure-relief line, said flow-measuring device disposed in said pressure-relief line.

9. A method for deNOxing exhaust gas from an internal combustion engine, which comprises:

determining, as a function of operating parameters of at least one of the internal combustion engine and a reduction catalytic converter operating under an SCR principle, an amount of reducing-agent solution to be metered and introducing the amount of the reducing agent into an exhaust pipe upstream of the converter while the internal combustion engine is operating;

when the internal combustion engine is at a stand-still, feeding gaseous reducing agent formed as a result of temperature effects to the converter; and recording and taking into account an amount of the gaseous reducing agent during a determination of an amount of reducing-agent solution to be metered during operation of the internal combustion engine.

10. The method according to claim 9, which further comprises supplying the gaseous reducing agent at a location inside the converter through a pressure-relief line connecting a reducing-agent reservoir and the converter.

11. The method according to claim 10, which further comprises feeding the gaseous reducing agent to the converter when a pressure in the reservoir exceeds a predetermined pressure level.

12. The method according to claim 11, which further comprises opening the pressure-relief line with a valve device disposed in the pressure-relief line when the predetermined pressure level is reached.

13. The method according to claim 11, which further comprises determining an amount of the gaseous reducing agent with a flow-measuring device disposed in the pressure-relief line.

14. The method according to claim 12, which further comprises determining an amount of the gaseous reducing agent from a value for the pressure in the reservoir and a duration of an opening of the valve device.

15. The method according to claim 13, wherein:

the reducing agent is aqueous urea solution; and the flow-measuring device is a flowmeter for ammonia.

* * * * *